(No Model.)
J. C. THOMAS.
CULTIVATOR.
No. 464,124. Patented Dec. 1, 1891.
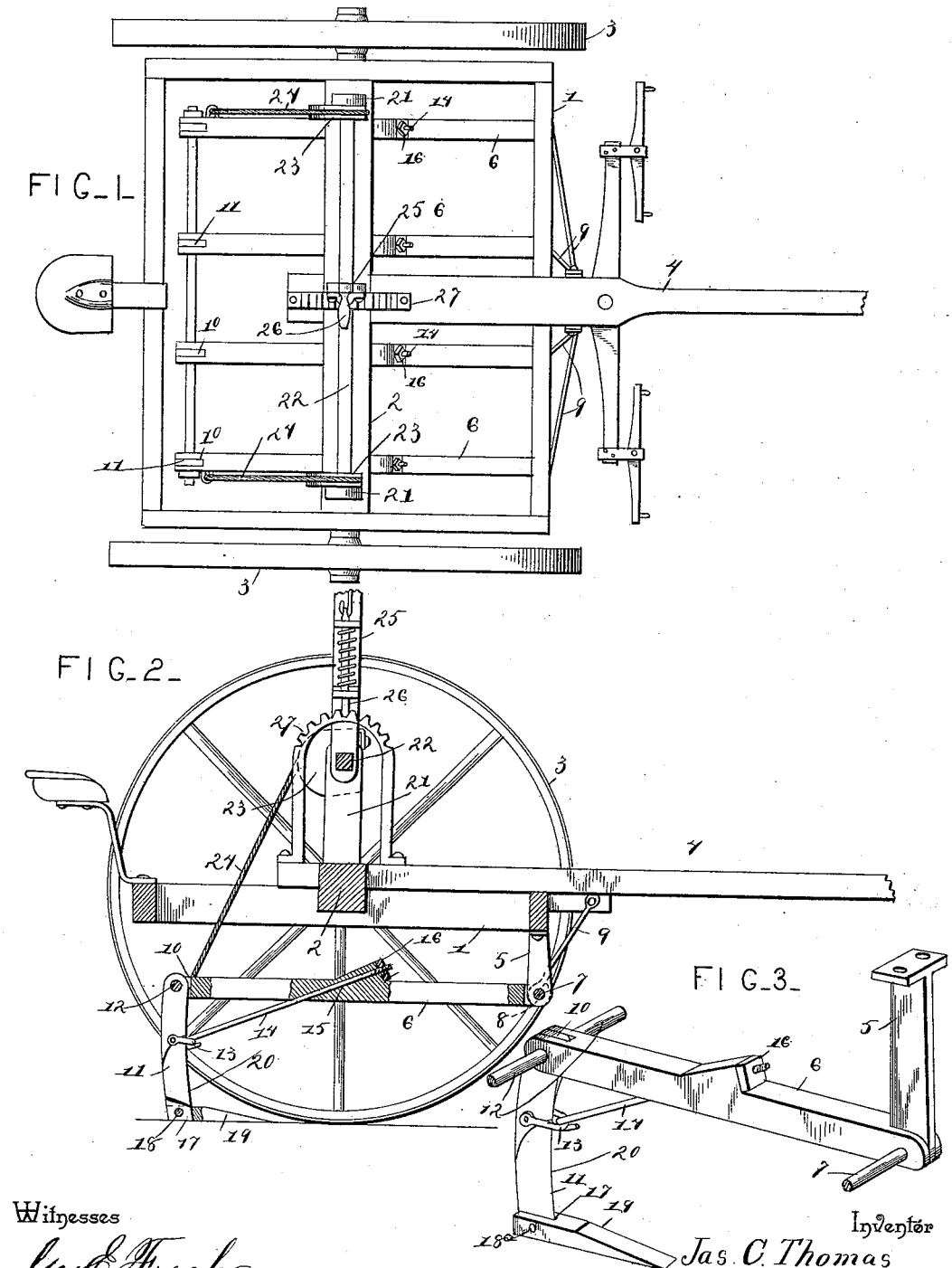
Witnesses
Geo. E. Frech
Wm. Bagger
Inventor
Jas. C. Thomas
By his Attorneys,
C. A. Snow & Co.

UNITED STATES PATENT OFFICE.

JAMES C. THOMAS, OF PILOT POINT, TEXAS.

CULTIVATOR.

SPECIFICATION forming part of Letters Patent No. 464,124, dated December 1, 1891.

Application filed March 4, 1891. Serial No. 383,767. (No model.)

*To all whom it may concern:*

Be it known that I, JAMES C. THOMAS, a citizen of the United States, residing at Pilot Point, in the county of Denton and State of Texas, have invented a new and useful Cultivator, of which the following is a specification.

This invention relates to cultivators; and it has for its object to provide an implement of this class, which shall be simple in construction and durable, and which may be successfully used for sub-soiling and for cultivating small grain.

The invention consists in the improved construction, arrangement, and combination of parts, which will be hereinafter fully described, and particularly pointed out in the claims.

In the drawings hereto annexed, Figure 1 is a plan view of a cultivator constructed in accordance with my invention. Fig. 2 is a longitudinal vertical sectional view of the same. Fig. 3 is a perspective detail view.

Like numerals of reference indicate like parts in all the figures.

1 designates a rectangular frame, which is suitably secured to the axle 2, having the transporting-wheels 3 3. 4 designates the tongue, which is suitably secured to the axle and to the frame, and which is provided in the usual manner with means for the attachment of the draft. The front cross-bar of the frame is provided with a series of downwardly-extending arms or brackets 5, to the lower ends of which the cultivator-beams 6 are hinged by means of a transverse rod 7. The latter also extends through suitable eyes 8 at the lower ends of brace-rods 9, which latter are suitably secured to the frame.

The cultivator-beams, at their rear ends, are bifurcated or provided with recesses 10, in which the standards 11 are mounted by means of a transverse rod 12, which extends through all of the cultivator-beams. The standards 11 are provided on their front edges with clips 13, which are connected with the beams 6 by means of brace-rods 14, extending through suitable inclined perforations 15 in the said beams and provided at their upper ends with nuts and washers 16, by means of which the standards may be adjusted at various degrees of inclination.

The lower ends of the standards are provided with recesses 17, the upper edges of which form shoulders and transverse perforations 18 for the reception of the blades 19, the normal positions of which are approximately horizontal, said blades serving as sub-soilers, while the front edges of the standards 11 are sharpened, as shown at 20, to enable them to cut through the soil. The blades and standards are connected together by transverse pins or bolts 18ª and the upper edges of the blades abut against the shoulders of the recesses.

The axle of the machine is provided with uprights 21, having bearings for a shaft 22, which is provided with eccentrics 23, connected by chains or ropes or other flexible connections 24 with the rod 12, by means of which the rear ends of the cultivator-beams are connected. It will be seen that by partially rotating the said shaft the entire series or gang of cultivators may be simultaneously raised or lowered, as desired. The shaft is operated by means of a lever 25, having a spring-catch, as 26, adapted to engage any one of the notches in rack-bar 27, which is suitably mounted upon the frame of the machine, thus enabling the cultivators to be retained at any desired adjustment.

The operation and advantages of my invention will be readily understood from the foregoing description, taken in connection with the drawings hereto annexed. In operation the gang of cultivators may be lowered to the desired depth, causing the blades to engage and pass under the surface of the soil, which is cut by means of the sharpened standards, while the blades 19 serve to break and pulverize the soil.

The machine is simple in construction, and it is found very efficient for the purposes set forth.

Having thus described my invention, what I claim is—

1. In a cultivator, the combination, with the frame-work comprising the transverse front bar and the central draft-tongue, of a series of brackets 5, depending from the said bar, the series of cultivator-beams bifurcated at their ends and embracing said brackets, the transverse pivoting rod passed through the brackets and front ends of the beams, the series of braces bolted at their upper ends to the tongue and at their lower ends terminating in bearing-eyes receiving the pivoting-rod, the standards secured at the rear of the beams, the transverse rod extending through the rear ends of the beams, and means for raising and lowering said series of beams, substantially as specified.

2. The combination, with the cultivator-standards having sharpened front edges and provided at their lower ends with recesses, the upper walls of which form shoulders, and with transverse perforations, of the blades bifurcated to straddle the recessed portions of said standards and at their upper sides abut against the said shoulders and secured to the standard by means of transverse pins, substantially as and for the purpose set forth.

In testimony that I claim the foregoing as my own I have hereto affixed my signature in presence of two witnesses.

JAMES C. THOMAS.

Witnesses:
W. E. MOFFITT,
J. L. WILLIAMS.